Patented July 25, 1950

2,516,477

UNITED STATES PATENT OFFICE 2,516,477

LECITHIN STABILIZER FOR DDT PETROLEUM SOLUTIONS

Charles W. Moberly, Bartlesville, Okla., assignor to Phillips Petroleum Company, a corporation of Delaware No Drawing. Application March 7, 1947, Serial No. 733,185

6 Claims. (Cl. 167—30)

This invention relates to stabilized, concentrated solutions of DDT [2,2-bis (parachlorophenyl)-1,1,1-trichloroethane] and to methods and materials for their preparation. In one particular aspect it relates to methods for preventing the separation of insoluble precipitates from concentrated solutions of DDT under low temperature conditions.

The term DDT in general commercial usage and as used in this specification refers to the chemical compound 2,2-bis (parachlorophenyl)-1,1,1-trichloroethane. This compound is well known to be highly effective as an insecticide. It is described in U. S. Patent No. 2,329,074 to Muller, reissued as Reissue No. 22,700. Muller discloses the use of DDT in solution in alcohol, petroleum or similar solvents or in aqueous emulsion. He suggests solutions or emulsions containing about 5 per cent DDT. Siegler, in U. S. Patent 2,358,942 teaches the use of water or other compatible liquid in the preparation of emulsions of DDT having low concentration. It has become common practice to employ emulsions or solutions containing DDT in low concentration as insecticides.

The advantages of concentrated solutions for purposes of storage and transportation are obvious. Since the solvents necessary for dilution or emulsification prior to use are usually obtainable at the location of use at low cost it has become common commercial practice to manufacture DDT solutions having high concentration and to dilute such concentrates prior to use. Petroleum solvents are commonly used in the preparation of these concentrates. Almost any desired cut of petroleum products could be used as a solvent for DDT but those composed chiefly of paraffins are less desirable as the solubility of DDT is comparatively low in these materials. Fractions containing cyclics and aromatics are preferred, since DDT is more soluble in such materials.

One preferred solvent for preparing concentrated DDT solutions is a petroleum fraction known as gas oil and further characterized by boiling in the range from about 385° F. to about 550° F., having a flash point of not less than 125° F. and having an aniline point of not more than 25° F. Solutions containing from 25 to 30 per cent by weight of DDT are easily prepared by the use of such gas oil at ordinary room temperatures of about 60° to 80° F.

The solubility of DDT in petroleum solvents, as would be expected, becomes less as the temperature decreases. A serious disadvantage of concentrated DDT solutions arises from this fact, since low temperatures such as are often encountered in freight transportation in the winter or in storage in unheated warehouses often decrease the solubility of DDT enough to cause a considerable proportion thereof to precipitate from solution and such precipitated DDT does not readily dissolve again when the mixture is warmed to normal room temperatures. The observed phenomenon of precipitation of DDT in excess of the quantity required to form a saturated solution at low temperature is peculiar and distinctive in that a large quantity is not precipitated as soon as the saturation temperature is passed, or even after "seeding" by initial crystal formation occurs, but the precipitation is very slow and may continue over a great many hours. The reason why the resulting precipitate does not again dissolve upon warming the mixture to room temperature is not known, but is probably connected in some way with the slowness of its formation.

Whatever the cause may be, it is known that DDT does precipitate from concentrated solutions in petroleum solvents under the influence of cold and that the resulting precipitate is difficult to redissolve in the solvent. It is obvious that the insecticidal effect of a mixture of DDT solution and crystals will not be uniform and that crystals present therein may clog dispensing equipment such as spray nozzles. DDT solutions which are stable and which contain 25 to 30 per cent DDT are greatly desired in commerce. A method for maintaining DDT in solution at low temperatures or for causing precipitated DDT to be easily redissolved would be a great advance in the art.

It is an object of my invention to provide solutions of DDT in petroleum solvents which are stabilized against precipitation of DDT at low temperatures.

Another object is to provide additives for concentrated solutions of DDT in petroleum solvents which stabilize such solutions against precipitation of DDT at low temperatures.

Another object is to provide a method for decreasing precipitation of DDT from solution in petroleum solvents at low temperatures.

Another object is to provide a method for causing crystals of DDT, formed from solution in a petroleum solvent, to be easily soluble in said solvent.

Other objects and advantages will become apparent to those skilled in the art as this disclosure proceeds.

I have discovered that the addition of a minor proportion of commercial lecithin to a solution of DDT in a petroleum solvent results in a solution that is stabilized against precipitation of DDT at low temperatures—that is the length of time such solution may be subjected to temperatures low enough to cause it to be supersaturated without separation of DDT crystals is greatly increased. When such crystals finally separate they are formed in small quantity only, remain suspended in the solution and quickly redissolve when the mixture is warmed to ordinary room temperatures, or about 70° F.

No special procedures are necessary for preparing such solutions. Any method which results in a petroleum solvent solution of DDT containing at least 0.5 weight per cent of lecithin is satisfactory. The effect of the lecithin added increases noticeably as the quantity added increases from 0.5 to 1.0 weight per cent. Further increases in the proportion of lecithin increase the stability of the solution so little that it does not pay to add more than 2.0 weight per cent of lecithin under present price conditions. More may be added, however, if desired, even up to the point of saturation of the solution with lecithin.

The mechanism by which lecithin stabilizes supersaturated solutions of DDT is unknown, but this property is possessed by very few substances. Such materials as gelatin, casein, purified rosin, beeswax, acryloid resin, HF soluble oil, "Paraflow" and "Santopour" do not inhibit the separation of heavy insoluble precipitates in a relatively short time.

My invention is directed to solutions of DDT in petroleum solvents generally but its principal commercial application will be to concentrated solutions of DDT in petroleum solvents having high cyclic and/or aromatic content. A preferred application is to solutions containing from 25 to 30 weight per cent of DDT in a petroleum solvent boiling in the range from 385° F. to 550° F., having a flash point of not less than 125° F. and an aniline point of not more than 25° F.

The following examples are given in order to illustrate the advantages gained in one embodiment of this invention. My invention, however, is not to be considered as limited to the particular petroleum solvent shown therein, nor to the concentration of DDT in the solutions shown in these examples, nor to the concentration of lecithin shown therein, but it is limited only by the scope of the attached claims.

Example I

Solutions were prepared containing 30 weight per cent of technical grade DDT in a gas oil having the following specifications:

| | |
|---|---|
| Boiling range, °F | 414–512 |
| Flash point, °F | 193 |
| Kauri-Butanol No | 107.6 |
| Aniline No., °F | 14.2 |
| Refractive index, 20° C | 1.5376 |
| API gravity, 60° F | 20.2 |
| Color (NPA) | 1½ |

A 10 cc. sample of such solution was placed in a ⅝" diameter glass test tube, lightly corked, and the test tube was suspended in a water-glycol bath maintained at −10° F.±1° F. A motor driven driven stirrer caused some vibration in the sample and the test tube was picked up for observation at intervals, when the solution was tipped back and forth in the tube. There was no other agitation while in the bath. This sample was clear when prepared at room temperature and remained clear for approximately 15 hours at −10° F. At the end of 16 hours at −10° F. a trace of crystalline material appeared. The quantity of crystalline material increased very slowly until approximately ½" of material had accumulated in the bottom of the test tube at the end of 88 hours. At the end of 160 hours at −10° F. crystalline material filled the entire volume occupied by the solution, and it was impossible to pour off the remainder solution. Since this crystalline material did not readily dissolve again when the mixture was warmed to room temperature it was evident that the usefulness of the solution had been greatly impaired.

Example II

To a 30 per cent solution of DDT prepared as in Example I was added 1.0 weight per cent of commercial lecithin. A 10 cc. sample of the resulting solution was placed in a ⅝" test tube and was maintained at −10° F. in the manner described in Example I. This sample remained clear for 144 hours. At the end of that time a trace of crystalline DDT appeared. The quantity of crystals slowly increased until at the end of 160 hours crystalline material filled the bottom of the tube to a depth of approximately ½".

Example III

To a 30 per cent DDT solution prepared as in Example I was added 2 weight per cent of lecithin. A 10 cc. sample of this solution was maintained at −10° F. in the manner described in Example I. The results were comparable to those of Example II. It was obvious that increase in lecithin concentration from 1 per cent to 2 per cent was uneconomical as practically no increase in stability over that of the 1 per cent solution resulted.

I claim:

1. A supersaturated solution of DDT in a petroleum solvent, containing from 0.5 to 2.0 weight per cent of lecithin.

2. A supersaturated solution of DDT in a petroleum solvent, containing at least 0.5 weight per cent of lecithin.

3. An insecticide solution comprising 25 to 30 weight per cent of DDT, 0.5 to 2.0 weight per cent of lecithin and a petroleum solvent, said solvent being characterized by boiling in the range from 385° F. to 550° F., having a flash point of not less than 125° F. and having an aniline number of not more than 25° F.

4. An insecticide solution comprising 25 to 30 weight per cent of DDT, at least 0.5 weight per cent of lecithin and a petroleum solvent, said solvent being characterized by boiling in the range from 385° F. to 550° F., having a flash point of not less than 125° F. and having an aniline number of not more than 25° F.

5. A solution of DDT in a petroleum solvent containing from 0.5 to 2.0 weight per cent of lecithin wherein the amount of dissolved DDT is sufficient that, on cooling, the solution will become supersaturated with DDT before reaching the temperature at which the solvent begins to crystallize.

6. A solution of DDT in a petroleum solvent containing from 0.5 to 2.0 weight per cent of lecithin, wherein the dissolved DDT is present in an amount sufficient to supersaturate said solution at a temperature above that at which the solvent begins to solidify.

CHARLES W. MOBERLY.

(References on following page)

REFERENCES CITED

The following references are of record in the file of this patent:

UNITED STATES PATENTS

| Number | Name | Date |
|---|---|---|
| 1,938,864 | Rewald | Dec. 12, 1933 |
| 2,109,143 | Wolff | Feb. 22, 1938 |
| 2,201,064 | Thurman | May 14, 1940 |
| 2,448,665 | Fleck | Sept. 7, 1948 |

FOREIGN PATENTS

| Number | Country | Date |
|---|---|---|
| 476,293 | Germany | May 13, 1929 |

OTHER REFERENCES

Cupples, "A List of Commercially Available Detergents, Wetting, Dispersing and Emulsifying Agents," Dept. Agrl. Publication E-504, June 1940, pages 1, 2, 56.

Fleck et al., Ind. and Eng. Chem., Feb. 1946, pages 177-178.

Jones et al., Jour. Economic Entomology, vol. 38, No. 2, April 1945, pages 207-210.